(12) United States Patent
Minarik et al.

(10) Patent No.: US 7,941,003 B2
(45) Date of Patent: May 10, 2011

(54) EFFICIENT CALCULATION OF ENSQUARED ENERGY IN AN IMAGING SYSTEM

(75) Inventors: Phillip Richard Minarik, Schaumburg, IL (US); Frederick Ray Seiter, Cary, IL (US); Dawn Lenore Bohlin, Rolling Meadows, IL (US); Sung-shik Yoo, Palatine, IL (US); Jesse James Kramer, Park Ridge, IL (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 1061 days.

(21) Appl. No.: 11/681,398

(22) Filed: Mar. 2, 2007

(65) Prior Publication Data

US 2008/0212830 A1    Sep. 4, 2008

(51) Int. Cl.
*G06K 9/32* (2006.01)
(52) U.S. Cl. .................................... 382/299; 250/559.04
(58) Field of Classification Search .................. None
See application file for complete search history.

(56) References Cited

U.S. PATENT DOCUMENTS

| | | | |
|---|---|---|---|
| RE31,370 E * | 9/1983 | Mashimo et al. | 396/110 |
| 6,108,110 A | 8/2000 | Orlov et al. | |
| 2002/0105656 A1 * | 8/2002 | Nahum et al. | 356/614 |
| 2003/0128347 A1 * | 7/2003 | Case et al. | 355/53 |
| 2005/0157943 A1 * | 7/2005 | Ruggiero | 382/276 |
| 2006/0001955 A1 * | 1/2006 | Kinney et al. | 359/391 |
| 2006/0006067 A1 | 1/2006 | Unger | |
| 2006/0012798 A1 * | 1/2006 | Jones et al. | 356/512 |
| 2006/0082731 A1 | 4/2006 | Drazic et al. | |
| 2006/0229744 A1 * | 10/2006 | Patzwald et al. | 700/59 |
| 2007/0076848 A1 * | 4/2007 | Walter et al. | 378/98.8 |
| 2007/0103717 A1 * | 5/2007 | Ono | 358/1.14 |

* cited by examiner

*Primary Examiner* — Andrew W Johns
*Assistant Examiner* — Tahmina Ansari
(74) *Attorney, Agent, or Firm* — Tarolli, Sundheim, Covell & Tummino LLP

(57) ABSTRACT

Systems and methods are provided for determining an ensquared energy associated with an imaging system. In one embodiment of the invention, a focal plane array captures an image of a target comprising a plurality of point sources, each point source being associated with a pixel within the focal plane array. An image analysis component estimates an ensquared energy value for the imaging system from respective intensity values of the associated pixels and known relative positions of the plurality of point sources.

20 Claims, 4 Drawing Sheets

EFFICIENT CALCULATION OF ENSQUARED ENERGY IN AN IMAGING SYSTEM

TECHNICAL FIELD

The present invention relates generally to optical technology, and more particularly to system for efficiently calculating an ensquared energy associated with a sensor.

BACKGROUND OF THE INVENTION

One measure of image sharpness in an imaging sensor is the amount of energy from a point source that can be contained, or ensquared, within a single pixel. To produce a valid measurement of the ensquared energy, the sensor and the target must be aligned precisely to place the point source exactly within the center of a pixel of interest within the image produced by the camera. Achieving this alignment has traditionally been a time consuming process, either involving the use of numerous images of the point source or a prolonged alignment procedure. This has not prevented the use of ensquared energy as an evaluation tool for imaging sensors, but time needed to produce accurate ensquared energy measurements has prohibited its use in real-time feedback, for example, as might be helpful during sensor construction.

SUMMARY OF THE INVENTION

In accordance with an aspect of the present invention, a system is provided for determining an ensquared energy associated with an imaging system. A focal plane array captures an image of a target comprising a plurality of point sources, each point source being associated with a pixel within the focal plane array. An image analysis component estimates an ensquared energy value for the imaging system from respective intensity values of the associated pixels and known relative positions of the plurality of point sources.

In accordance with another aspect of the present invention, a method is provided for efficient measurement of ensquared energy in an imaging system. An image of a target comprising a plurality of point sources is captured. The point sources are positioned at one of a plurality of offset positions, such that the distance, in at least one of the horizontal and vertical direction, between the center point of a first light beam projected by a first point source onto a focal plane array associated with the imaging system and a center point of a second light beam projected by a second point source projected onto the focal plane array is a non-integer number of pixels. An ensquared energy value is determined for each point source. An ensquared energy value is estimated for the imaging system from the determined ensquared energy values for the plurality of point sources.

In accordance with yet another aspect of the present invention, a system is provided for determining an ensquared energy of an imaging system. A target positioned at a known distance from the imaging system, such that a plurality of virtual pixels can be defined on the target, with each virtual pixel corresponding to a pixel within a focal plane array associated with the imaging system. A plurality of point sources of electromagnetic radiation are positioned within respective virtual pixels on the target such that each of the plurality of point sources is placed within a different offset position relative to the center of its respective virtual pixel for an imaging sensor that captures an image of the target. An image analysis component estimates an ensquared energy value for the imaging system from respective ensquared energy values of the associated pixels and known relative positions of the plurality of point sources.

DETAILED DESCRIPTION OF INVENTION

Figure 1:
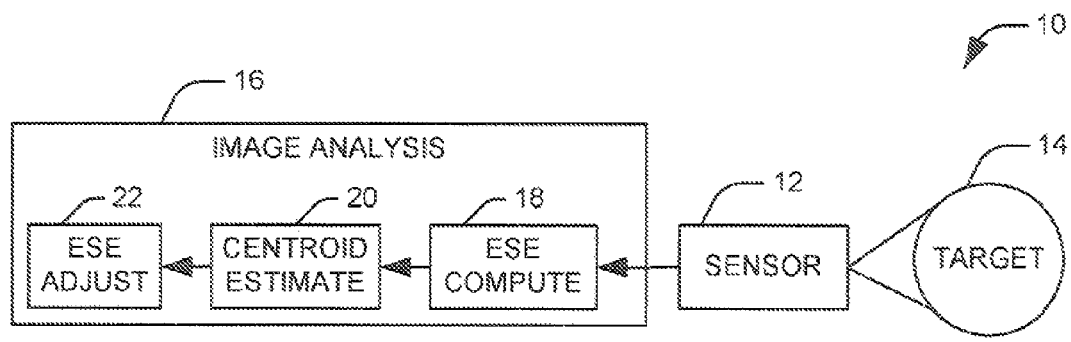
FIG. 1 illustrates an exemplary system for determining simplified Ensquared Energy measurements in accordance with an aspect of the present invention.

FIG. 1 illustrates an exemplary system 10 for determining simplified Ensquared Energy (ESE) measurements in accordance with an aspect of the present invention. The system 10 comprises a sensor 12 that is positioned to capture an image of a target 14. In accordance with an aspect of the present invention, the target 14 is constructed as to provide a plurality of point sources within the view of the camera. For example, a straightforward array of point sources can be provided by placing small holes (e.g., approximately one-twentieth the size of a pixel) through an opaque surface and positioning a direct or indirect light source of the appropriate type for the sensor behind the target. For some applications, quantum dots or fluorescent beads can be utilized as point sources. The point sources are arranged across the target at a sufficient distance such that light from one source will not contribute significant amounts of energy (e.g., >1% of the total energy) to a pixel associated with another light source.

In a given application, the resolution of the camera and the distance between the camera and the target will be known, such that the general size of a region on the target imaged by a given pixel on the focal plane array is known. Accordingly, the positioning of the point sources within the target can be conceptualized in the context of a virtual pixel grid across the surface of the target. Each point source is positioned within a respective pixel in the virtual grid with a separation of several pixels maintained between point sources to prevent contamination of the measurement at each pixel. It will be appreciated that the defined virtual pixel grid is likely to be misaligned relative to the sensor such that the center of a pixel within the defined virtual grid may not correspond to the actual position of the pixel center in the defined image. In accordance with an aspect of the present invention, each point source can be placed with a different offset, expressed in fractions of a pixel, relative to the center of its virtual pixel to guarantee that a point source image is within a fraction of the center of a pixel. Accordingly, the distance between the light beams projected by a given pair of point sources onto the focal plane array should be a non-integer number of pixels in at least one of the horizontal and vertical direction.

An image of the target can then be passed to an image analysis component 16. It will be appreciated that the image analysis component 16, and its constituent components 18, 20, and 22, can be implemented as dedicated hardware, a computer software program implemented on a general purpose program, or some combination of the two. An ensquared energy computation component 18 determines an associated ensquared energy (ESE) for each virtual pixel containing a point source. A pixel having the largest ensquared energy can be selected to provide a minimum ensquared energy for the system. Comparing the ensquared energies with the pattern in which the point sources are arranged, a maximum offset of the point source from the actual pixel center can be determined. This offset, along with an estimate of the point spread function of the sensor optics (e.g., as a Gaussian function), can be utilized to calculate a maximum ensquared energy for the sensor. The ratio of the two values provides an indication of the maximum expected error for the ensquared energy of the selected pixel.

In an exemplary implementation, a better estimation can be achieved by estimating the actual position of the pixel relative to the selected point source. The determined ensquared energy values are then passed to a centroid estimation component 20 that estimates the center of an actual pixel on the image array relative to the center of the virtual pixel. It will be appreciated that the ensquared energy associated with a given virtual pixel will vary according to the offset of the point source from the center of the actual pixel. Accordingly, by identifying the virtual pixels having the largest ensquared energy, the point source positions. For example, by looking at the relative values of the ensquared energies associated with the known point source locations as well as the expected point spread function for the sensor optics, it is possible to estimate the location of the actual pixel center.

Once an estimate of the pixel center has been determined, the value of the maximum ensquared energy value associated with the selected pixel can be adjusted at an ensquared energy adjustment component 22. Since the point spread function of the sensor optics can be estimated from known properties of the optics, it is possible to estimate the relative loss of ensquared energy due to the offset of the point source from the actual pixel center as a multiplicative coefficient. Accordingly, an accurate estimate of the ensquared energy can be determined in real time, allowing the ensquared energy to be used as feedback in adjusting the focus and interior alignment of the imaging sensor, specifically the focal plane array 14.

Figure 2:
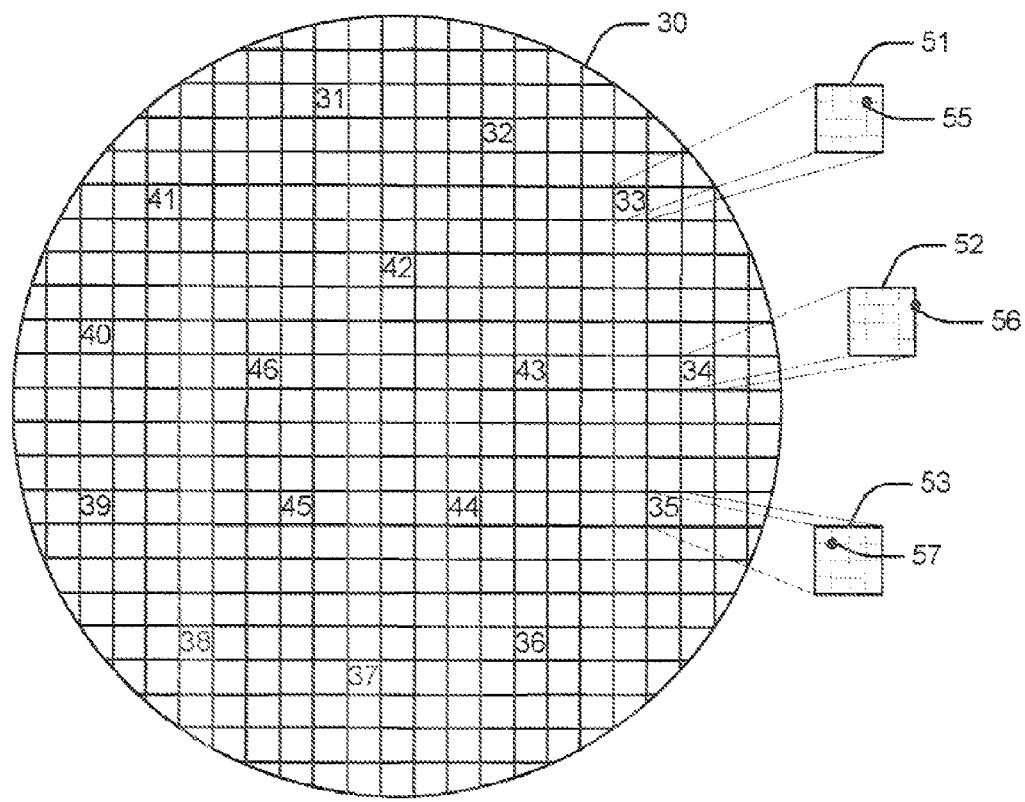
FIG. 2 illustrates an exemplary target, comprising a plurality of point sources located at respective pixel locations within a defined virtual pixel grid in accordance with an aspect of the present invention.

FIG. 2 illustrates an exemplary target 30, comprising a plurality of point sources located at respective pixel locations 31-46 within a defined virtual pixel grid. In the illustrated example, each of the selected pixel locations is separated from its nearest neighboring pixels by a center-to-center distance of at least four pixels. In accordance with an aspect of the present invention, each point source is positioned with a different discrete offset from the center of its virtual pixel in one or both of the horizontal and vertical directions. For example, horizontal and vertical offsets, along respective horizontal and vertical axes of zero, one-half pixel in a first direction on the axis, and a one-quarter pixel offsets in both the first direction and a second direction. It will be appreciated that the size and shape of the target can vary, and that the point sources can be placed differently, for example, in a linear pattern instead of a circular pattern, depending on a specific application. It will further be appreciated that multiple targets or mirrored images of targets can be used to evaluate the ensquared energy in multiple locations within the field of view of a given imaging sensor.

Pixel locations 33, 34, and 35 are shown in respective expanded views 51, 52, and 53. In each expanded view, 51-53, the pixel is shown as divided into units of one-quarter pixel. At a first pixel location 33, a first point source 55 is placed at a position that is offset by one quarter pixel vertically upward and by one quarter pixel horizontally to the right as viewed from the perspective of a camera. At a second pixel location 34, a second point source 56 is placed at a position that is offset by one quarter pixel vertically upward and by one-half pixel horizontally to the right. At a third pixel location 35, a point source 57 is placed at a position that is offset by one quarter pixel vertically upward and by one quarter pixel horizontally to the left. Each of the remaining pixel locations 36-46 has a point source placed with a different offset according to a predetermined pattern.

Figure 3:
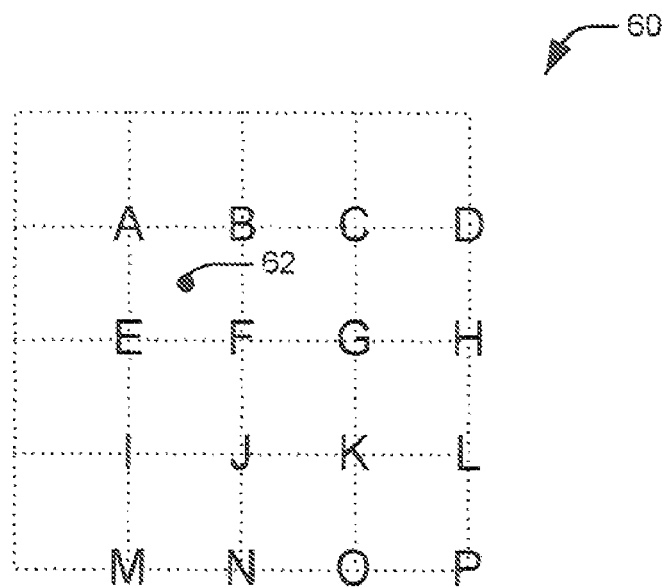
FIG. 3 illustrates a first pattern that can be used to assign point source locations within respective virtual pixels on a target in accordance with an aspect of the present invention.

FIG. 3 illustrates a pattern 60 that can be used to assign point source locations within respective virtual pixels on a target. The pattern 60 is intended for a target utilizing sixteen pixel locations, with one of the illustrated point source locations A-P, utilized at each pixel location. The point source closest to an actual pixel center 62 can be determined as the point source associated with the pixel having the highest ensquared energy. It will be appreciated that using the illustrated pattern, regardless of the actual alignment of the camera relative to the virtual pixel array, the actual center of at least one of the pixels must be within one eighth of a pixel vertically and one eighth of a pixel horizontally from the point source within the pixel, such that the maximum offset between the actual center and the closest point source is equal to $$\frac{\sqrt{2}}{8} \approx 0.177.$$

Even at the maximum possible offset, the ensquared energy at the pixel associated with the closest point source provides a reasonable estimate of the ensquared energy that would be obtained given a perfect alignment between the point source and the actual center of the pixel. The maximum percentage error for a target utilizing the illustrated pattern can be estimated from an estimated point spread function of the sensor as the ratio of an ideal ensquared energy according to the point spread function to the worst cast estimate (e.g., maximum offset) of the ensquared energy using the function. In one implementation, several point sources producing the best ensquared energy on their associated pixels (e.g., A, B, E, and F) can be selected, and an estimated pixel center can be interpolated from their position and their associated ensquared energy values. From this interpolated location and the estimated point spread function of the sensor, an adjustment value can be calculated for the highest ensquared energy value to correct for error in the alignment of the sensor and the target.

Figure 4:
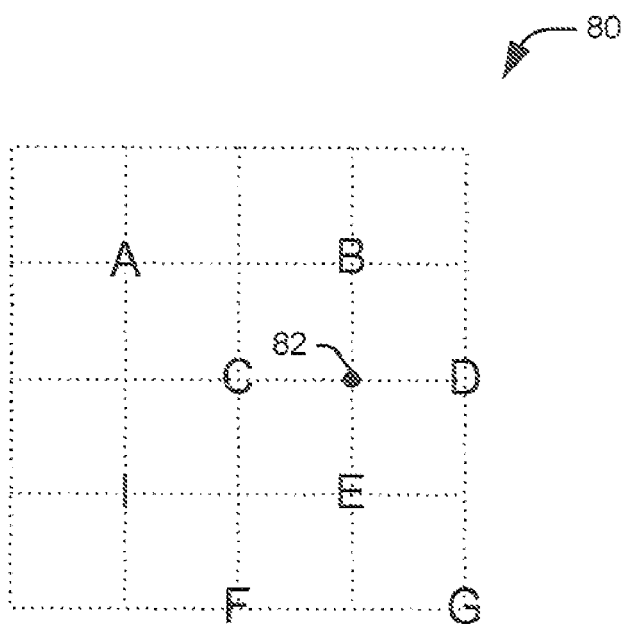
FIG. 4 illustrates a second pattern that can be used to assign point source locations within respective virtual pixels on a target in accordance with an aspect of the present invention.

FIG. 4 illustrates a pattern 80 that can be used to assign point source locations within respective virtual pixels on a target. The pattern 80 is intended for a target utilizing eight pixel locations, with one of the illustrated point source locations A-G, utilized at each pixel location. The point source closest to an actual pixel center 82 can be determined as the point source associated with the pixel having the highest ensquared energy. It will be appreciated that using the illustrated pattern, regardless of the actual alignment of the camera relative to the virtual pixel array, the actual center of at least one of the pixels must be within one quarter of a pixel from the actual pixel center 82.

Even at the maximum possible offset, the ensquared energy at the pixel associated with the closest point source provides a reasonable estimate of the ensquared energy that would be obtained given a perfect alignment between the point source and the actual center of the pixel. The maximum percentage error for a target utilizing the illustrated pattern can be estimated from an estimated point spread function of the sensor as the ratio of an ideal ensquared energy according to the point spread function to the worst cast estimate (e.g., maximum offset) of the ensquared energy using the function. In one implementation, several point sources producing the best ensquared energy on their associated pixels (e.g., B, C, D, and E) can be selected, and an estimated pixel center can be interpolated from their position and their associated ensquared energy values. From this interpolated location and the estimated point spread function of the sensor, an adjusted value can be calculated for the highest ensquared energy value to correct for error in the alignment of the sensor and the target.

Figure 5:
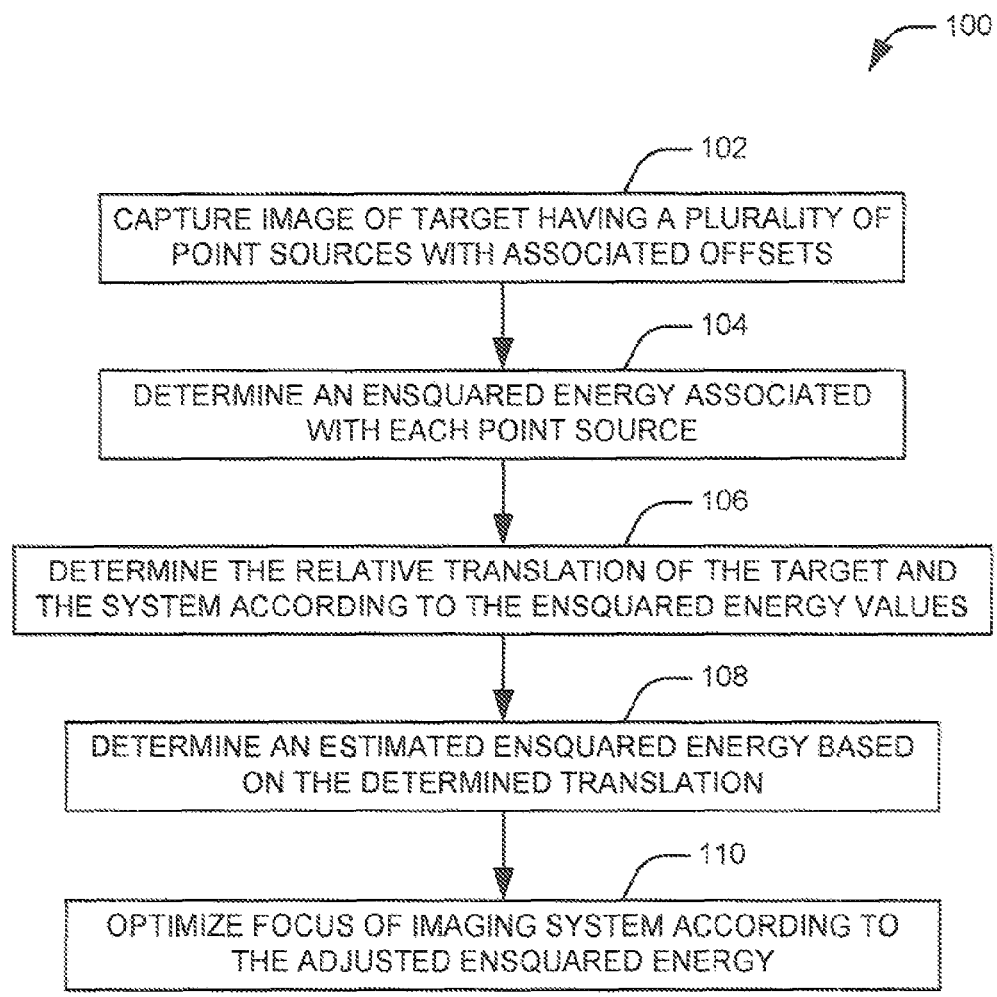
FIG. 5 illustrates an exemplary methodology for efficient adjustment of optical components within an imaging system in accordance with an aspect of the present invention.

In view of the foregoing structural and functional features described above, methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 5 illustrates an exemplary methodology 100 for efficient adjustment of optical components within an imaging system in accordance with an aspect of the present invention. The illustrated methodology 100 can determine an estimate of the ensquared energy in real time, such that adjustments can be made to the optics of the imaging system in response to the ensquared energy measurement. At 102, an image of a target, having a plurality of point sources, is captured. In accordance with an aspect of the present invention, the point sources can be arranged such that, when viewed on a virtual array of pixels that map positions on the target to the focal plane array, each point source is offset from every other point source by a non-integer number of pixels. It will be appreciated that the size of the pixels in the virtual array can be determined from the distance between the target and the imaging system and the optical characteristics of the imaging system, but the alignment between the imaging system and the target is not known, such that the virtual pixel array can exhibit one or both of a vertical and a horizontal translation relative to an accurate mapping of the target to the focal plane array. The offsets between the pixels are selected to minimize the effect of this translation, with each point source in a different location relative to the center of its virtual pixel such that at least one point source will be near an actual center of its associated pixel on the focal plane array.

At 104, an ensquared energy for each point source can be determined. If will be appreciated that each point source will correspond to a pixel within the focal plane array, and that the ensquared energy can be determined from the intensity of its corresponding pixel. At 106, the translation between the target and the position can be calculated from the ensquared energy values of the point sources. Specifically, since the position of each point source is known relative to the center of its virtual pixel, the point sources having the largest ensquared energy values can be used to interpolate a position for an actual pixel center, that is, the position in which the center of each virtual pixel would be if the target and the imaging system were properly aligned.

At 108, an estimated ensquared energy can be determined based on the determined translation. For example, an adjustment value can be determined from an expected point spread function of the imaging system and the position of the point source having the largest associated ensquared energy value. This adjustment value can then be applied to the largest ensquared energy value to account for error due to translation between the target and the imaging system. At 110, the adjusted ensquared energy is used to optimize the focus of the imaging system. For example, the position of a focal plane array or other optical component associated with the imaging system can be adjusted (e.g., via translation or rotation) to achieve an optimal value for the ensquared energy, in one implementation, the ensquared energy can be determined for multiple locations on the focal plane array. Accordingly, the position of the focal plane can be adjusted to provide balanced values for the ensquared energy across the entire focal plane array.

Figure 6:
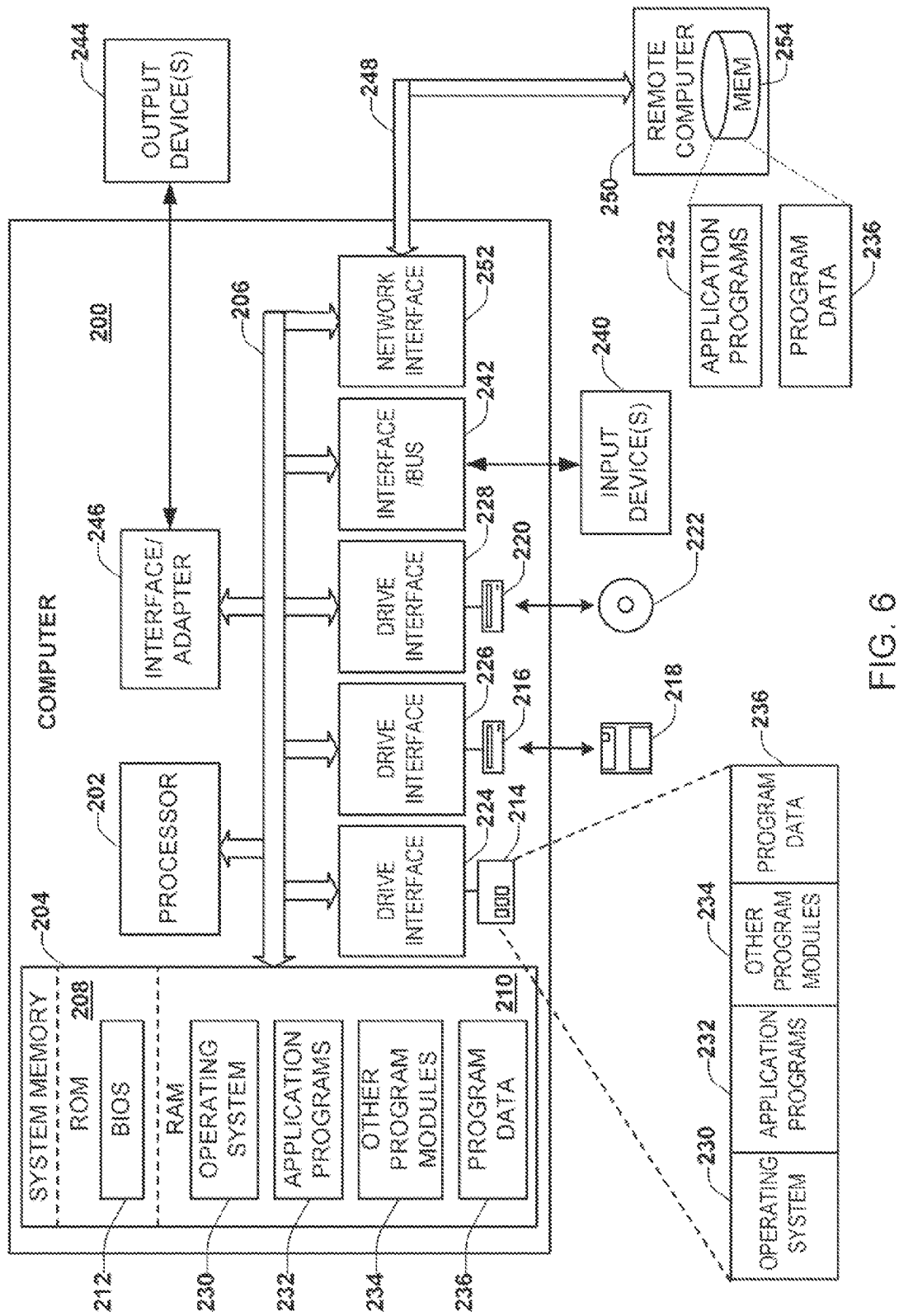
FIG. 6 illustrates a computer system that can be employed to implement systems and methods described herein, such as based on computer executable instructions running on the computer system.

FIG. 6 illustrates a computer system 200 that can be employed to implement systems and methods described herein, such as based on computer executable instructions running on the computer system. The computer system 200 can be implemented on one or more general purpose networked computer systems, embedded computer systems, routers, switches, server devices, client devices, various intermediate devices/nodes and/or stand alone computer systems. Additionally, the computer system 200 can be implemented as part of the computer-aided engineering (CAE) tool running computer executable instructions to perform a method as described herein.

The computer system 200 includes a processor 202 and a system memory 204. A system bus 206 couples various system components, including the system memory 204 to the processor 202. Duel microprocessors and other multi-processor architectures can also be utilized as the processor 202. The system bus 206 can be implemented as any of several types of bus structures, including a memory bus or memory controller, a peripheral bus, and a local bus using any of a variety of bus architectures. The system memory 204 includes read only memory (ROM) 208 and random access memory (RAM) 210. A basic input/output system (BIOS) 212 can reside in the ROM 208, generally containing the basic routines that help to transfer information between elements within the computer system 200, such as a reset or power-up.

The computer system 200 can include a hard disk drive 214, a magnetic disk drive 216, e.g., to read from or write to a removable disk 218, and an optical disk drive 220, e.g., for reading a CD-ROM or DVD disk 222 or to read from or write to other optical media. The hard disk drive 214, magnetic disk drive 216, and optical disk drive 220 are connected to the system bus 206 by a hard disk drive interface 224, a magnetic disk drive interface 226, and an optical drive interface 228, respectively. The drives and their associated computer-readable media provide nonvolatile storage of data, data structures, and computer-executable instructions for the computer system 200. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 210, including an operating system 230, one or more application programs 232, other program modules 234, and program data 236.

A user may enter commands and information into the computer system 200 through user input device 240, such as a keyboard, a pointing device (e.g., a mouse). Other input devices may include a microphone, a joystick, a game pad, a scanner, a touch screen, or the like. These and other input devices are often connected to the processor 202 through a corresponding interface or bus 242 that is coupled to the system bus 206. Such input devices can alternatively be connected to the system bus 306 by other interfaces, such as a parallel port, a serial port or a universal serial bus (USB). One or more output device(s) 244, such as a visual display device or printer, can also be connected to the system bus 206 via an interface or adapter 246.

The computer system 200 may operate in a networked environment using logical connections 248 to one or more remote computers 250. The remote computer 248 may be a workstation, a computer system, a router, a peer device or other common network node, and typically includes many or all of the elements described relative to the computer system 200. The logical connections 248 can include a local area network (LAN) and a wide area network (WAN).

When used in a LAN networking environment, the computer system 200 can be connected to a local network through a network interface 252. When used in a WAN networking environment, the computer system 200 can include a modem (not shown), or can be connected to a communications server via a LAN. In a networked environment, application programs 232 and program data 236 depicted relative to the computer system 200, or portions thereof, may be stored in memory 254 of the remote computer 250.

What has been described above includes exemplary implementations of the present invention, if is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Having described the invention, the following is claimed:

1. A method for efficient measurement of ensquared energy in an imaging system, the method comprising:
    capturing an image of a target comprising a plurality of point sources at a sensor associated with the imaging system, wherein the point sources are positioned at one of a plurality of offset positions, such that the distance, in at least one of the horizontal and vertical direction, between the center point of a first light beam projected by a first point source onto a focal plane array associated with the sensor and a center point of a second light beam projected by a second point source projected onto the focal plane array is a non-integer number of pixels that is greater than one;
    determining an ensquared energy value for each point source; and
    estimating an ensquared energy value for the imaging system from the determined ensquared energy values for the plurality of point sources.

2. The method of claim 1, wherein determining an ensquared energy value for the imaging system comprises selecting a largest ensquared energy value from the determined ensquared energy values for the plurality of point sources.

3. The method of claim 1, wherein determining an ensquared energy value for the imaging system comprises:
    selecting a plurality of points sources having the largest determined ensquared energy values;
    determining a relative translation between the target and the imaging sensor from the offset positions associated with the selected point sources; and
    adjusting a largest ensquared energy value from the determined ensquared energy values according to the determined translation.

4. The method of claim 1, further comprising:
    determining the degrees of arc associated with a given pixel on the target in the horizontal and vertical directions from at least one optical property of the imaging system and a distance between the target and the imaging system to map positions on the target to an array of virtual pixels; and
    assigning the plurality of point sources to the plurality of offset positions, such that each point source is positioned at a different location within its associated virtual pixel relative to the center of its virtual pixel.

5. The method of claim 4, wherein the plurality of offset positions selected for the plurality of point sources are selected to have respective associated offsets from their virtual pixel centers such that the associated point sources, if their associated virtual pixels were overlaid onto a common pixel, would form a rectangular grid pattern.

6. The method of claim 1, further comprising adjusting at least one optical property of the imaging system in response to the estimated ensquared energy value for the imaging system.

7. The method of claim 1, wherein capturing an image of the target comprising a plurality of point sources comprises capturing an image of the target at a plurality of locations on the focal plane array to provide an estimated ensquared energy value for each of the plurality of locations.

8. A system for determining an ensquared energy associated with an imaging system, the system comprising:
    a focal plane array that captures an image of a target comprising a plurality of point sources, each point source being associated with a pixel within the focal plane array; and
    an image analysis component that estimates an ensquared energy value for the imaging system from respective intensity values of the associated pixels and known relative positions of the plurality of point sources.

9. The system of claim 8, the image analysis component being operative to select a largest ensquared energy value from the determined ensquared energy values for the plurality of point sources.

10. The system of claim 8, wherein the plurality of point sources are arranged on the target at one of a plurality of offset positions, such that the distance, expressed in pixels, between each pair of the point sources in at least one of the horizontal and vertical direction is a non-integer number of pixels.

11. The system of claim 10, the image analysis component comprising:
    an ensquared energy computation component that determines respective associated ensquared energy values for the plurality of point sources
    a centroid estimation component that selects a plurality of point sources having the largest ensquared energy values and determines a position of a pixel center relative to the position of a point source associated with a largest determined ensquared energy values from the offset positions associated with the selected point sources; and an ensquared energy adjustment component that adjusts a largest ensquared energy value from the determined ensquared energy values according to the determined location of the pixel center relative to the position of the point source associated with the largest determined ensquared energy value.

12. The system of claim 8, wherein the image analysis component is operative to estimate an ensquared energy for the imaging system in real time, such that the position and orientation of the focal plane array can be adjusted in response to the estimated ensquared energy.

13. The system of claim 8, wherein an image of the target is captured at a plurality of locations on the focal plane array to provide an ensquared energy value for each of the plurality of locations.

14. A system for estimating an ensquared energy of an imaging system, the system comprising:
- a target that positioned at a known distance from the imaging system, such that a plurality of virtual pixels can be defined on the target, with each virtual pixel corresponding to a pixel within a focal plane array associated with the imaging system;
- a plurality of point sources of electromagnetic radiation positioned within respective virtual pixels on the target such that each of the plurality of point sources are placed within a different offset position relative to a center of its respective virtual pixel;
- an imaging sensor that captures an image of the target; and
- an image analysis component that estimates an ensquared energy value for the imaging system from respective ensquared energy values of the associated pixels and known relative positions of the plurality of point sources.

15. The system of claim 14, the target comprising an opaque surface, and the plurality of point sources comprising appropriately sized holes in the opaque surface.

16. The system of claim 14, the plurality of point sources comprising one of quantum dots and fluorescent beads.

17. The system of claim 14, the image analysis component being operative to determine respective associated ensquared energy values for the plurality of point sources and select a largest ensquared energy value from the determined ensquared energy values for the plurality of point sources.

18. The system of claim 14, the image analysis component comprising:
- an ensquared energy computation component that determines respective associated ensquared energy values for the plurality of point sources
- a centroid estimation component that selects a plurality of point sources having the largest ensquared energy values and determines a position of an actual pixel center on the focal plane array relative to the position of a point source associated with a largest determined ensquared energy value from the offset positions associated with the selected point sources; and
- an ensquared energy adjustment component that adjusts a largest ensquared energy value from the determined ensquared energy values according to the determined location of the pixel center relative to the position of the point source associated with the largest determined ensquared energy value.

19. The system of claim 14, wherein the plurality of point sources are positioned within their associated virtual pixels such that the point sources, if their associated virtual pixels were overlaid onto a common pixel, would form a rectangular grid pattern.

20. The system of claim 14, wherein an image of the target is captured at a plurality of locations on the focal plane array to provide an ensquared energy value for each of the plurality of locations.

* * * * *